INVENTORS
JACQUES BADOZ
MICHEL BILLARDON
BY *Abraham A. Saffitz*
ATTORNEY

Nov. 17, 1970 J. BADOZ ETAL 3,540,827
APPARATUS FOR MEASURING CIRCULAR DICHROISM
UTILIZING PHOTOELASTIC MEANS
Filed May 26, 1967 5 Sheets-Sheet 4
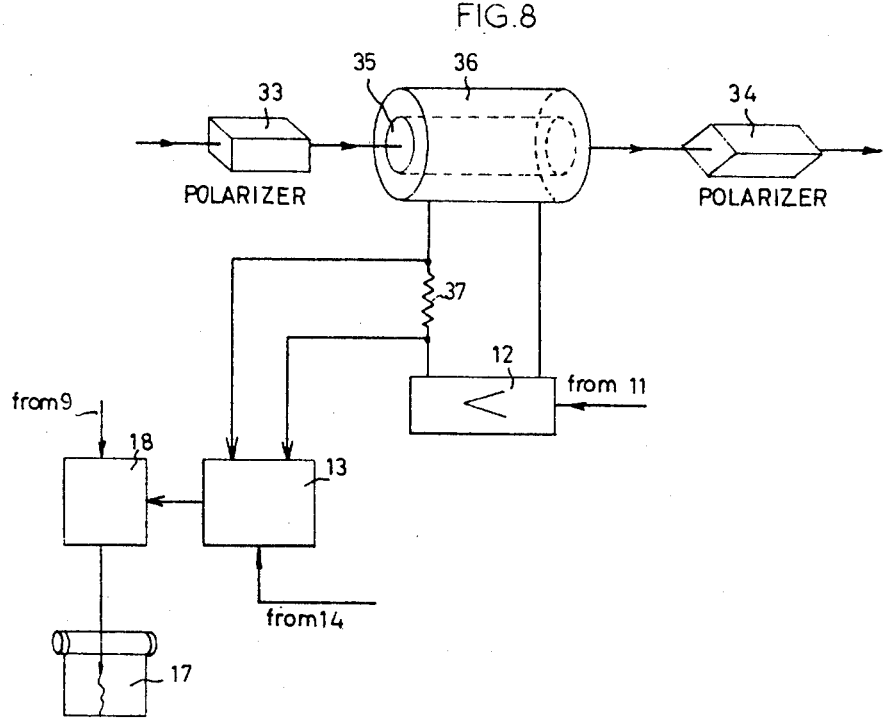
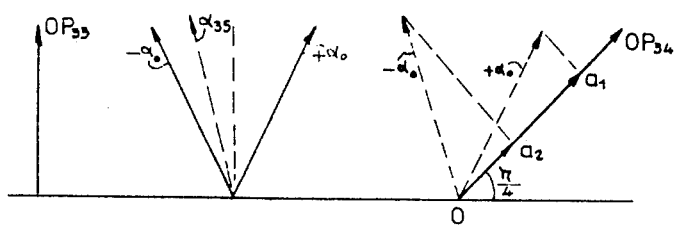
INVENTORS
JACQUES BADOZ
MICHEL BILLARDON
BY Abraham A. Saffitz
ATTORNEY

United States Patent Office 3,540,827
Patented Nov. 17, 1970

3,540,827
APPARATUS FOR MEASURING CIRCULAR DICHROISM UTILIZING PHOTOELASTIC MEANS
Jacques Badoz, Bagneux, and Michel Billardon, Chilly-Mazarin, France, assignors to Centre National de la Recherche Scientifique, Paris, France, a body corporate of France
Filed May 26, 1967, Ser. No. 641,507
Claims priority, application France, May 26, 1966, 63,064
Int. Cl. G01n 21/40
U.S. Cl. 356—114                                    5 Claims

ABSTRACT OF THE DISCLOSURE

Apparatus for measuring the circular dichroism of optically active specimens comprising means for obtaining a monochromatic beam of light, rectilinearly polarized, means for varying the intensity of said beam, means for periodically varying the polarization of said beam from a left elliptically polarized light to a right elliptically polarized light, an electro-optical transducer adapted to receive said variable polarization light beam and means for controlling the beam intensity varying means by the signal from said transducer, in which the polarization varying means are great grasping power means (i.e., accept light rays forming a beam of large solid angle about the axis of the beam) including a plate of photoelastic material, a piezoelectric transducer coupled to said plate and an elongated bar undergoing acoustical longitudinal vibrations and having inserted at its middle the photoelastic plate and the piezoelectric transducer.

---

The present invention relates to an apparatus for measuring and recording circular dichroism. This apparatus permits the measurement and recording, as a function of the wavelength, of the difference $(K_l - K_r)$ of the extinction coefficients $K_l$ and $K_r$ corresponding to the left and right circularly polarized forms of light respectively. The term "extinction coefficient" is intended to mean a quantity K defined by $I/I_0 = e^{-K}$, where $I_0$ is the light intensity incident upon an absorbent medium and I is the light intensity emerging from the said medium.

The measurement of circular dichroism is of great importance in the determination of structures and in the study of atomic or molecular properties of products which are naturally or artificially optically active. Experimental difficulties have limited the sensitivity and the accuracy of the different measuring methods and apparatus hitherto proposed.

The object of the present invention is the provision of practical apparatus, which is very sensitive and accurate, enabling the value of circular dichroism $(K_l - K_r)$ to be recorded by a null method as a function of the wavelength in the ultraviolet and visible region, or as a function of any other parameter (time, temperature, etc.).

The accurate measurement of circular dichroism is a matter of delicacy, but improves to the extent that the following conditions are realized:
 (a) Quasi-simultaneous measurement of $K_l$ and $K_r$;
 (b) Use of a null measuring method;
 (c) The use of as large a luminous flux as possible.

These conditions are examined in greater detail in the following:

The difference $(K_l - K_r)$ being very small compared to each of the coefficients of molecular absorption $K_l$ and $K_r$, it is not very accurate to trace independently the variation of $K_l$ and $K_r$ with the wavelength to determine the difference later; accordingly, most of the solutions proposed for effecting measurement of circular dichroism as a function of wavelength consist in measuring $K_l$ and $K_r$ and determining the difference immediately for a given wavelength before causing any substantial variation of this wavelength.

To achieve this condition two methods can be employed:
 (a1) The first method is space-sequential and consists of spacially dividing a light beam into two beams, one of which is circularly polarized in a left-handed manner and the other in a right-handed manner and in comparing successively and rapidly the absorption coefficients caused by the specimen which is placed alternately in each of the beams.
 (a2) The second method is purely sequential and consists of transmitting to the specimen successively and periodically left circularly polarized light and right circularly polarized light. The absorption of these light beams is then measured successively with the same period, and the difference of the absorptions is then determined.

This solution is described in "Comptes-Rendus de l'Academie des Sciences," 1960, 251, page 2150, by Marc Grosjean and Maurice Legrand.

(b) Since the measurement of circular dichroism amounts to measuring the difference of two luminous fluxes, it is necessary to render the apparatus insensitive to the inevitable unpredictable fluctuations of the physical quantities involved (light intensity delivered by the source, amplifier gains, photoelectric cells, etc.). It is well known that the use of a null method enables this condition to be satisfied.

Among the solutions used at present, only the space-time method (a1) lends itself easily to the use of a null method. The unequal absorption of the left and right circular light beams by the medium is compensated exactly by an equal and opposite attenuation of the intensity of the incident beams.

It is well known (see J. Badoz, Journal of Physics 17, 143A, 1956) that the sensitivity of a polarimetric assembly becomes greater, all other things being equal, with increase in the light flux used to effect the measurement. To increase the flux it is necessary to use a light source which is as brilliant as possible and to increase as much as possible the grasping power of the light beam, the expression "light grasping power" or "acceptance" being intended to mean the product of the solid angle formed by the rays traversing a pupil and the surface of this pupil.

Brilliant light sources are generally not very stable and their use makes it absolutely necessary to employ a null method.

The increase of the geometric extent of the beam assumes that the optical elements employed are of as large a section as possible and accept light rays which are considerably inclined to the axis of the beam.

These two conditions have not been fulfilled in the apparatus hitherto proposed.

The object of the invention is to provide an apparatus for measuring and recording circular dichroism, which fulfills the three conditions enumerated above, to effect a sensitive and accurate measurement of this circular dichroism.

In this apparatus, the unequal absorption of left circularly polarized light and right circularly polarized light by an active specimen is detected by a sequential method. This unequal absorption is compensated by acting upon the flux intensity of the incident beam in order to effect a null measuring method which permits the use of high luminance sources. More exactly, there is transmitted to the dichroic medium at any instant light of suitable polarization which is periodically varied at the frequency $f$ and the intensity of which is automatically adjusted, in a known and measurable manner, by a device which will be designated in the following by the name "flux polarizer and adjuster," so that at the output of the dichroic medium the light intensity comprises no term which varies at the frequency $f$.

The optical assembly is constructed in such a manner that the grasping power of the beam is as large as is permitted by the accuracy of measurement. In particular, the polarization or birefringence modulator producing the light which is periodically left elliptically and right elliptically polarized is of a new type permitting the use of a light beam of greater angle than that of the birefringence modulators proposed hitherto.

The birefringence modulator comprises a plate of a photoelastic material which is transparent and isotropic, coupled to a piezoelectric transducer and placed in the middle of a bar to which the piezoelectric transducer applies standing longitudinal vibrations. When the rod is an acoustical half wave rod, a pressure antinode exists at the center. As this center is occupied by the transparent and isotropic plate and this plate is photoelastic, the vibrations transform this plate, at resonance, into an anisotropic medium which is alternatively positive and negative. The neutral axes are fixed and are respectively the axis of the bar and a line perpendicular to this axis.

Birefringent modulators having a photoelastic plate subjected to standing longitudinal vibrations of a bar possess great advantages over other types of birefringence modulators. They are very easy to construct. They require only a small electrical power to operate and a small electric voltage, unlike the birefringence modulators relying on the Pockels' effect. They present high transparency to light because they can be constructed, as far as the central plate is concerned, with various materials transparent to infrared, visible or ultraviolet radiation (silica, glass, sodium chloride, fluorine, etc.).

In addition, the birefringence modulators of the invention maintain their modulating properties even for rays which are substantially inclined to the mean direction of the beam, unlike the Pockels' effect modulators; they are thus modulators which possess a large grasping power. Finally, placed between two crossed or parallel polarizers, they can form light flux modulators of high efficacity, enabling the provision of a sinusoidal light beam which is particularly lacking in harmonics (the even harmonics are nil and the uneven harmonics are less than 1% for a modulation degree greater than 50%).

The invention will now be described in detail with reference to the attached drawings, in which:

FIGS. 8 and 9 show respectively a second type of flux polarizer and adjuster and a polarization diagram for the explanation of the operation of this adjuster; and, FIGS. 10 and 11 show respectively a third type of adjuster and an explanatory polarization diagram.

Figure 1:
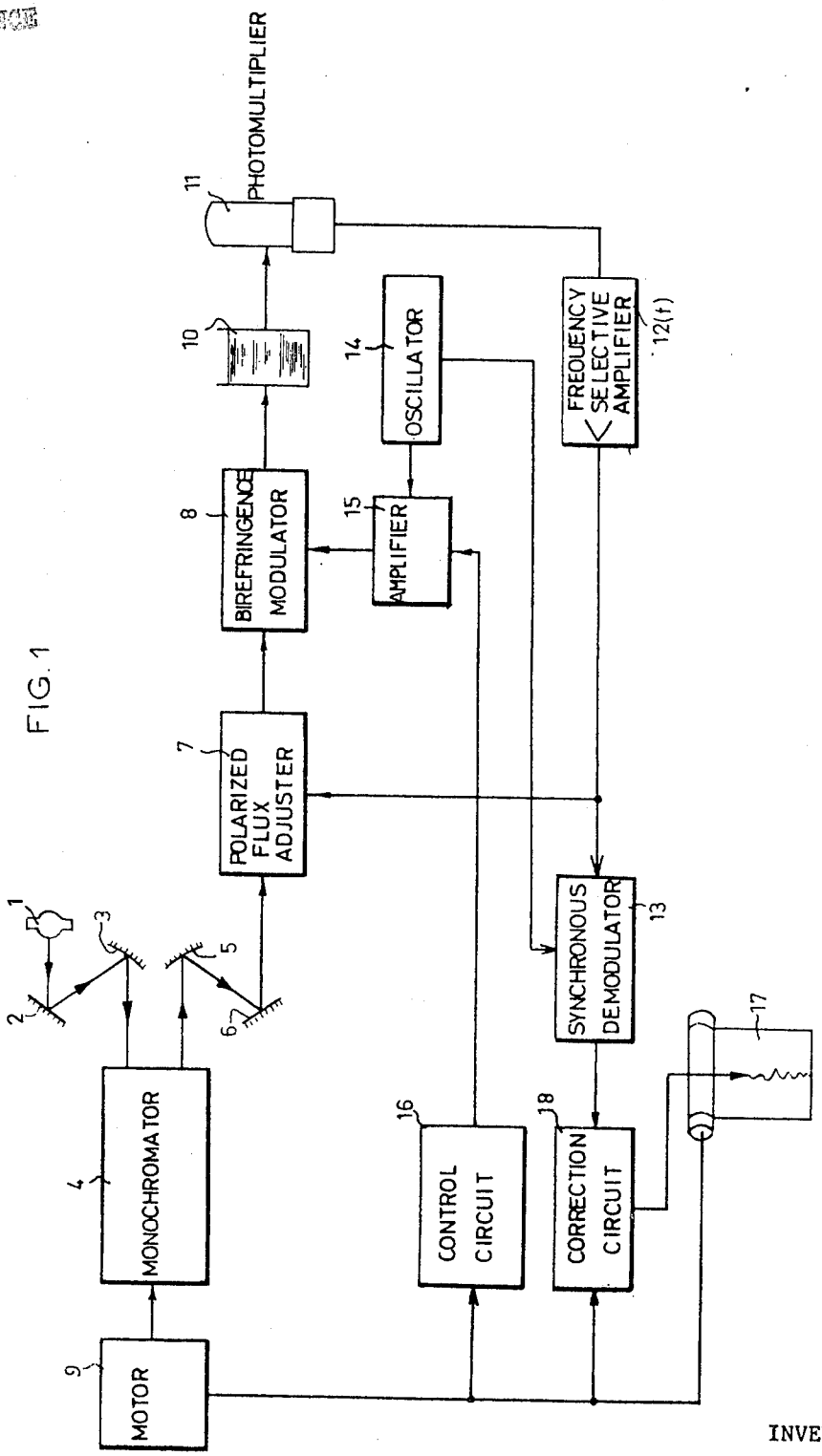
FIG. 1 shows in the form of a block diagram the apparatus according to the invention for measuring and recording circular dichroism.

Referring to FIG. 1, the circular dichroism measuring apparatus, comprises a brilliant light source 1 constituted by a deuterium or Xenon lamp fed with direct current or alternating current at 60 c./s., emitting in the visible and ultraviolet region of the spectrum, and two mirrors 2 and 3 directing light coming from the source to an input slit of a monochromator 4, having a Jarrell Ash grating. A motor 9 ensures the scanning in wavelength by driving the grating. The light coming from the output slit of the monochromator is gathered by mirrors 5 and 6 and directed towards the optical elements forming the apparatus for measuring circular dichroism.

At the output of the mirror 6, the light passes through a polarizer and flux adjusting device 7 which delivers a plane polarized light wave of fixed direction and having an intensity which is periodically variable at the frequency $f$ between the two limits $$\phi_0(1 \pm \sin x)$$

in which $x$ and $y$ are two parameters which are adjustable and measurable. The intensity of the outgoing light can be represented by the formula:

$$\Phi_1 = \Phi_0\{1 + y \sin [x \cdot \sin (2\pi ft + \varphi)]\} \quad (1)$$

Figure 6:
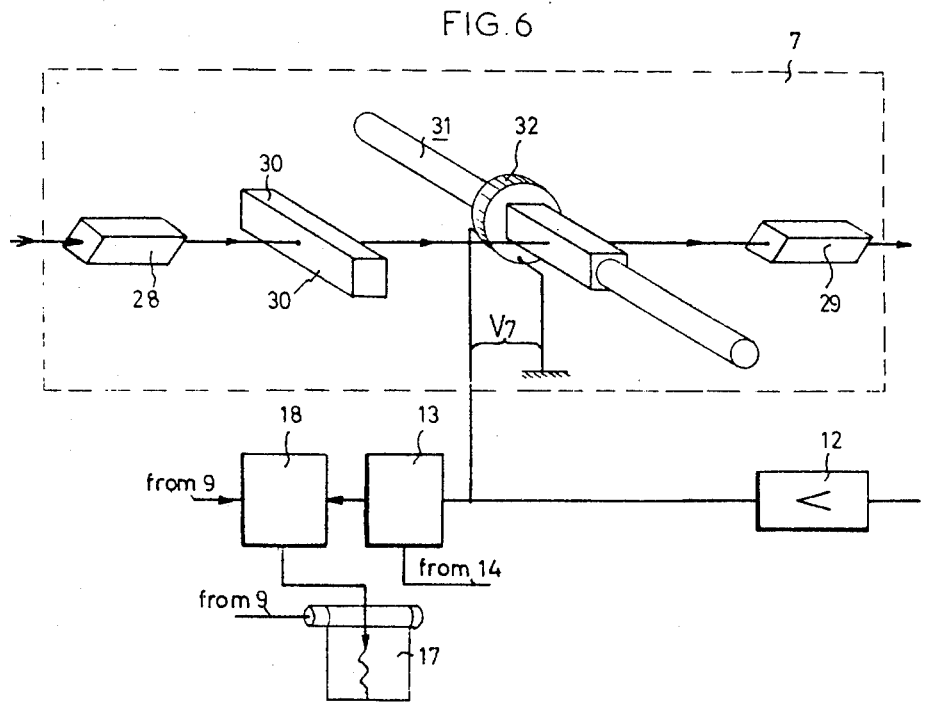
FIGS. 6 and 7 show respectively a first type of flux polarizer and adjuster and a polarization diagram for the explanation of the operation of the flux adjuster.
Figure 10:
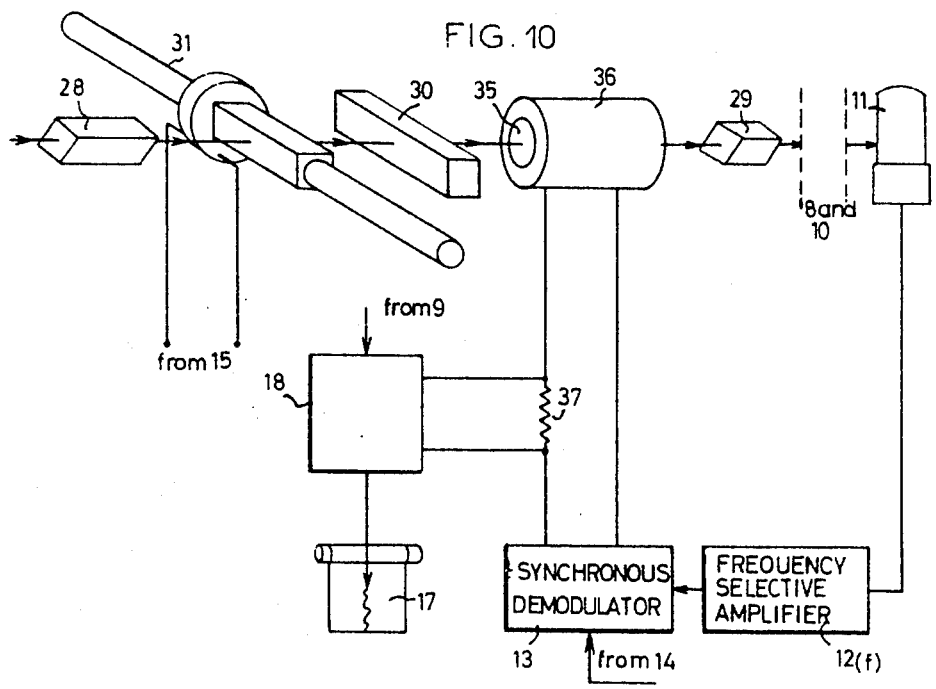

Parameter $x$ has the character of the amplitude of a sinusoidal time modulated term and parameter $y$ has the character of the amplitude of a nonmodulated term which depends on the structure of the flux adjuster. The value of $x$ together with the value of $y$ when it is different from unity will be given hereinafter for each structure of the flux adjuster; in short:

In FIG. 6, the flux adjuster is a photoelastic birefringence modulator and $x$ is the maximal optical path difference of the modulator;

In FIG. 8, the flux adjuster is a Faraday effect cell and $x$ is equal to twice the maximum amplitude of the Faraday angle;

In FIG. 10, the flux adjuster is a light modulator together with a photoelastic birefringence modulator; $x$ is, like in FIG. 6, the maximal optical path difference of the modulator and $y$ is equal to twice the maximal amplitude of the Faraday angle, as in FIG. 8 (in FIG. 10, the Faraday effect cell is not modulated).

At the output of the flux polarizer and adjuster 7, the light passes through a birefringence modulator device 8 which alternately converts, at the same frequency $f$, the plane polarized incident light into left elliptically polarized light and then right elliptically polarized light of the same ellipticity, every half period. The intensity of these lights varies in accordance with a law imposed by the values of $x$, $y$ and $\varphi$ of Formula 1. The birefringence modulator is controlled by an oscillator 14 at the frequency $f$ through an amplifier 15. A control circuit 16 acting on the amplifier 15 controls the maximum ellipticity of the light provided by the birefringence modulator in order to maintain this ellipticity constant whatever may be the wavelength applied to the monochromator 4.

The light coming from the birefringence modulator 8 is applied to a natural dichroic medium 10 (a tank containing an optically active liquid, or dichroic solid material, etc.) or to an artificial dichroic material (an inactive material subjected to a magnetic field, for example). At the output of the dichroic medium the light flux varies as a function of time in accordance with the law:

$$\Phi = \frac{\Phi_0}{2}\left\{1 + y \sin [x \sin (2\pi ft + \varphi)]\right\}$$
$$e^{-K}[2 - (k_l - k_r) \sin 2\pi \delta(t)] \quad (2)$$

where $\delta(t)$ depends on the birefringence modulator 8 and is of the form $\delta(t) = \delta_8 \cdot \sin 2\pi ft$ ($\delta_8$, constant) in the case of sine birefringence variation and where $$K = \frac{1}{2}(K_1 + K_r)$$

The expression (2) is valid on condition that $(K_1 - K_r)$ is small compared with K, which is always physically realized.

The flux $\Phi$ is received by a photoelectric cell or a photomultiplier 11. It can be shown that the output voltage of the cell 11 includes in particular two terms at the frequency $f$, in phase opposition, the one $V_1(f)$ being proportional to the dichroism $(K_1 - K_r)$, the other $V_2(f)$ depending on $x$. This voltage, suitably phase-shifted, selectively amplified at the frequency $f$ in the amplifier 12, controls the flux adjuster 7 and fixes the value of the parameter $x$ in such manner that $V_1$ and $V_2$ are of equal amplitude, to within an error voltage which is rendered negligible in comparison with $V_1$ and $V_2$. If the dichroism $(K_1-K_r)$ is small enough, it is then seen that the voltage controlling the flux adjuster is proportional to the dichroism to be measured. The output signal of the selective amplifier 12 is applied to a synchronous demodulator 13 which receives a reference signal from the oscillator 14 and the direct voltage from the demodulator 13 is applied to a recorder 17, which derives its movement from the motor 9 of the monochromator, through a correction circuit 18.

The detection of the phase of the voltage controlling the adjusted [0 or $\pi$ according ot the sign of $(K_1-K_r)$] by the synchronous detector 13 permits the sign of the dichroism to be retained.

Figure 2:
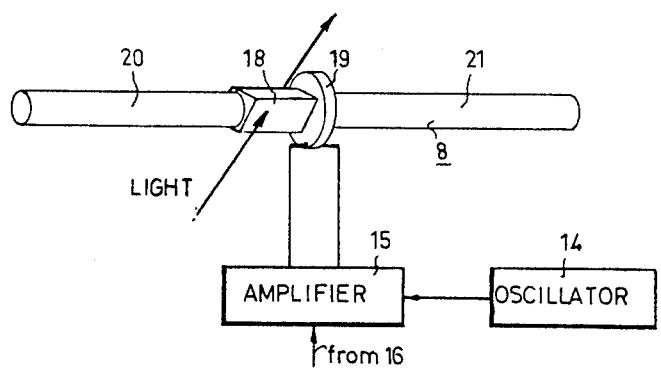
FIG. 2 shows the birefringence modulator included within the apparatus.
Figure 3:
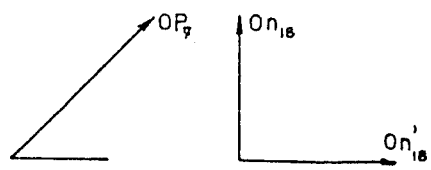
FIG. 3 is a polarization diagram, intended for the explanation of the birefringence modulator of FIG. 2.

The birefringence modulator 8 is illustrated in FIG. 2. It is constituted by a transparent plate 18 of variable birefringence the neutral lines $On_{18}$ and $On'_{18}$ (FIG. 3) of which make an angle of 45° with the direction $OP_7$ of the rectilineary polarized light coming from the flux polarizer and adjuster 7. The birefringence of this plate varies alternatively at the frequency $f$ and enables the rectilinear light coming from the flux polarizer and adjuster 7 to be converted, in the course of a period, into light taking all elliptical polarizations between a left elliptical light and a right elliptical light of the same ellipticity, which is suitably chosen.

The plate 18 is a parallelepiped of fused silica of dimensions 1 x 1 x 3 cm., highly annealed, subjected to periodic stresses of tensions and compresion of frequency $f$ and a magnitude sufficient to produce in the silica parallelepiped a suitable photoelastic birefringence having neutral lines respectively parallel to and perpendicular to the direction of the stresses.

The stresses applied to the plate 18 are produced by means of a piezoelectric transducer 19 and two rods 20 and 21 of steel, magnesium or glass, stuck end to end.

The piezoelectric transducer 19 is excited by a voltage of frequency $f$, equal to the longitudinal resonance frequency of the bar 20–18–19–21 in half wavelength mode. A low frequency generator 14 supplies a voltage at the frequency of oscillation of the bar. This voltage, suitably amplified by the amplifier 15, drives the piezoelectric capsule 19. The amplitude of oscillation of the bar, and thus the birefringence induced into the plate 18, is controlled by operating on the gain of amplifier 15. This control is a function of the wavelength of the light coming from the monochromator 4, and is obtained with the aid of a control circuit 16 (FIG. 1).

Figure 4:
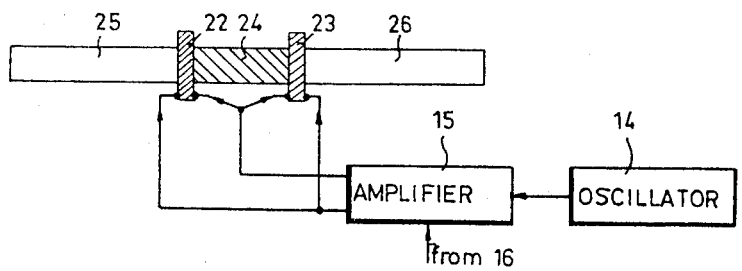
FIGS. 4 and 5 are modifications of the birefringence modulator.

Another embodiment of the birefringence modulator 8 is shown in FIG. 4. Two piezoelectric transducers 22 and 23 are placed one on each side of the transparent silica or glass parallelepiped 24 and the two bars 25 and 26 are stuck to the external surfaces of these transducers. These transducers are then driven in parallel by amplifier 15.

As an example, a modulator constructed in accordance with FIG. 4 and with the following materials:

24: parallelepiped bar of glass of dimensions 20 mm. x 13 mm. x 13 mm.;
22 and 23: two piezo-oxide "Transco" transducers of thickness 3 mm. and of diameter 16 mm., silvered on the lateral faces for the voltage inputs;
25 and 26: two bars of steel of 12 mm. diameter and of 120 mm. length;

resonates in half wavelength mode at 8,200 Hertz with a bandwidth at 3 db of 30 Hertz and a Q of approximately 200 and provides a path difference $$\sigma_m = \frac{(n_1-n_2)e}{\lambda}$$

of 0.29 ($n_1$, $n_2$ are slow and fast indices $e$ is the thickness of the glass bar (here 13 mm.), and $\lambda$ is the wavelength) with a voltage of 19 volts RMS applied to the cartridges and an electric power of 0.17 watt. The birefringence modulator is supported by resilient supports, not shown, at one quarter and three quarters of its length.

Figure 5:
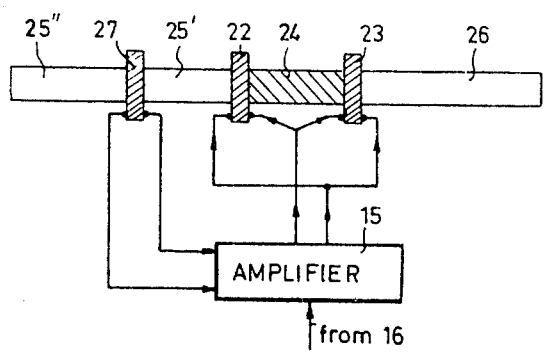

In a third modification shown in FIG. 5, another cartridge 27 can be arranged at a further intermediate point on a bar 25 or 26, for example in the middle of the bar 25 which is then, as shown in FIG. 5, divided into two bars 25' and 25''. The voltage produced between the terminals of the cartridge 27 by the elastic waves propagating along the bar can be applied to the input of the amplifier 15 in place of the generator 14 of the two assemblies of FIGS. 2 and 4. Provided that the transfer function of the amplifier 15 is suitable, a self-oscillating birefringence modulator can be obtained. The amplitude of oscillation of the bar, and therefore the birefringence induced in the part 24, is controlled by operating upon a nonlinear element of the amplifier 15.

The piezoelectric receiver 27 could be replaced by any microphonic receiver placed for example at the end of 25 or 26.

The flux polarizer and adjuster 7 can be of the same photoelastic type as the birefringence modulator 8 or of a different type.

FIG. 6 represents the flux polarizer and adjuster 7 which comprises an upstream polarizer 28 and a downstream polarizer 29 having their respective directions of polarization $OP_{28}$ and $OP_{29}$ parallel or crossed (FIG. 7), a quarter wave system 30 placed between the two polarizers and constituted by a Fresnel rhomb or by an adjustable photoelastic plate and of which the neutral lines $On_{30}$ and $On'_{30}$ make an angle of $\pi/4$ with $OP_{28}$ and $OP_{29}$, and a birefringence modulator 31 of the type shown in FIGS. 2, 4 or 5 (it has been assumed in FIG. 6 that the birefringence modulator was of the type of FIG. 2), of which the neutral lines $On_{31}$ and $On'_{31}$ are respectively parallel to $On_{30}$ and $On'_{30}$. This birefringence modulator 31 is similar to birefringence modulator 8 but must not be confused with it. The true birefringence modulation function of the apparatus is performed by birefringence modulator 8. Birefringence modulator 31 together with optical elements 28, 29 and 30 performs the function of flux polarization and adjustment; it is excited at the frequency $f$ by the piezoelectric element 32 which it includes.

Figure 7:
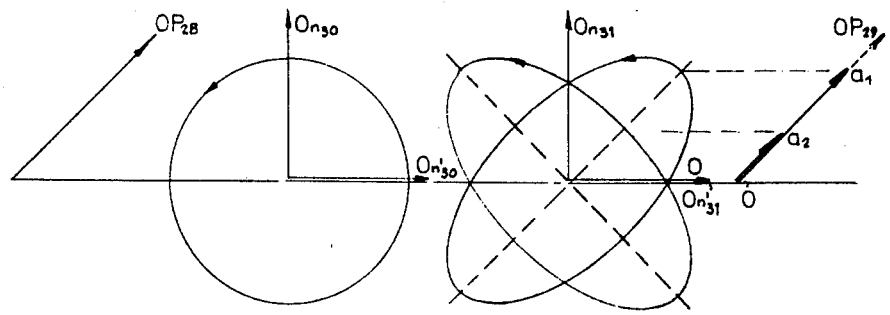

FIG. 7 shows for two instants separated by a half period, the polarization modes at the output of the elements 30, 31 and 29; it will be seen that at the output of 29 the polarization is rectilinear and that the amplitude varies between $Oa_1$ and $Oa_2$.

When the system is unbalanced, the current coming from the photomultiplier 11 includes a term at the frequency $f$ which is amplified by the high gain selective amplifier 12. The birefringence of the birefringence modulator 31 is then established through the feedback loop constituted by the light beam, the phototube 11, the amplifier 12 and the element 32 at a level such that the term at the frequency $f$ in the photomultiplier current cancels, to within an error component. The parameter $x$ of the expression 1 is then: $x=2\pi\delta_7$, $\delta_7$ being the maximum optical path difference given by modulator 31 according to Equation 3.

If the gain of amplifier 12 is sufficient the dichroism to be measured takes the form $$K_1-K_r \approx -\frac{2\pi\delta_7}{J_1(2\pi\delta_8)}(1+\pi d)$$

in which $\delta_8$ is the maximum optical path difference in wavelengths introduced by the birefringence modulator 8; $d$ is the difference between the true optical path difference due to the plate 30 and an optical path difference equal to $\frac{1}{4}$; $d$ is assumed to be quite small; $J_1$ indicates the Besel function of order unity.

The voltage $V_7$ applied to the piezoelectric element 32 is proportional to $\delta_7$, and thus to the dichroism to be measured. This voltage is measured by means of the synchronous demodulator 13, the reference voltage for which is provided by the oscillator 14.

In order that the constant of proportionality of the voltage $V_7$ to the dichroism $(K_1-K_r)$ to be measured, shall be the same for all the wavelengths, it is necessary to maintain $\delta_8$ constant by operating on the gain of the amplifier 15 by means of the control circuit 16 which is coupled to the driving motor for the monochromator 4 and to compensate the chromatism of $\delta_7$ by means of the correction circuit 18, also coupled to the monochromator 4.

The polarized flux adjuster 7 of FIG. 8 is constituted by two polarizers 33 and 34 of which the principal directions $OP_{33}$ and $OP_{34}$ make between them an angle of $\pi/4$, $OP_{34}$ being at an angle of $\pi/4$ with the neutral lines of the birefringence modulator 8. Between the polarizers 33 and 34 there is arranged a Faraday effect cell 35 formed by a transparent medium, for example a container filled with water, in which a solenoid 36 produces a periodic magnetic field at the frequence $f$ and induces a magnetic rotary power $\alpha_{35}=\alpha_0 \sin(2\pi ft+\varphi)$ of which the maximum amplitude $\alpha_0$ is proportional to that of the current passing through the solenoid.

The polarization at the output of the polarized prism 34 has a fixed direction $OP_{34}$ but an amplitude at the frequency $f$ which is variable between $Oa_1$ and $Oa_2$ (FIG. 9).

The current from the photomultiplier 11 is selectively amplified at the frequency $f$ by means of the high gain amplifier 12. The output current of amplifier 12 passes through the solenoid 36.

The parameter $x$ of the expression (1) is then:

$$x=2\alpha_0$$

wherein $\alpha_0$ is the maximum amplitude of the Faraday angle. Then:

$$K_1-K_r=\frac{J_1(2\alpha_0)}{J_1(2\pi\delta_8)}$$

As $\alpha_0$ is always small:

$$K_1-K_r \approx \frac{2\alpha_0}{J_1(2\pi\delta_8)}$$

The voltage developed by the current energizing the solenoid 36, in the resistance 37, is detected in the synchronous detector 13, the reference voltage of which is derived from the output of oscillator 14. This voltage, compensated at 18 to take into account the chromatism of $\alpha_0$, is recorded in the recorder 17.

Figure 11:
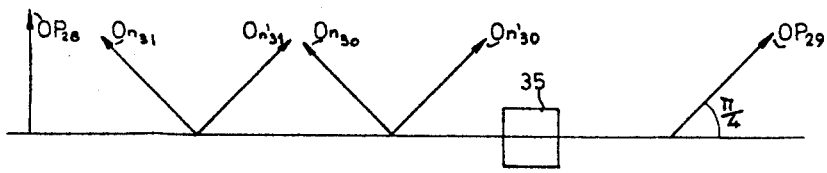

In the modified forms of flux polarizer and adjuster which will now be described with reference to FIGS. 10 and 11, the flux adjuster, instead of comprising a single member driven by the alternating output voltage of the selective amplifier 12, comprises two members, one of which is a light modulator and is excited by an alternating voltage at frequency $f$ and of constant amplitude, obtained at the output of the amplifier 15 which already supplies the birefiringence modulator, and the other of which is an amplitude modulator designed to vary the intensity of the alternating light flux produced by the light modulator and is fed with the output voltage of the selective amplifier after synchronous demodulation.

The polarized flux adjuster comprises, between two polarizers 28 and 29, a birefringence modulator 31, a quarter wave plate 30 which is substantially achromatic (for example a Fresnel rhomb of silica) and a magneto-optical Faraday cell 35–36. The birefringence modulator 31 is controlled by an alternating voltage at the frequency $f$ of constant amplitude and the magneto-optical cell 35–36 is controlled by the direct current from the synchronous demodulator 13. The polarization directions of the polarizers 28 and 29 and the neutral axes of the birefringence modulator 31 and the quarter wave plate 30 are orientated as shown in FIG. 11.

Provided that the gain of the selective amplifier 12 is high enough, the dichroism is given by the following formula:

$$K_1-K_r\frac{4\Lambda I_{13}J_1(2\pi\delta_{31})}{J_1(2\pi\delta_8)}\cdot\frac{\cos 2\pi d}{1-2\Lambda I_{13}2\pi d}$$

in which:

$I_{13}$ is the output current from demodulator 13 $(y-2\Lambda I_{13})$;

$2\pi d$ is the difference between the phase shift due to 30 and $\pi/2$;

$d$ is always small enough for $\cos 2\pi d/(1-2\Lambda I_{13}2\pi d)$ to be close to unity, $2\pi\delta_8$ is the maximum phase shift presented by the birefringence modulator 8; and $x=2\pi\delta_{31}$ is the maximum phase shift presented by the element 31.

If $\delta_8$ and $\delta_{31}$ are close enough, a condition which is obtained in the construction, it is seen that the variations of $\delta_8$ and $\delta_{31}$ with the wavelength have no influence on the operation of the device, and this is advantageous.

$\Lambda$ is a factor of proportionality of the magneto-optical cell dependent on the wavelength. The voltage developed by the passage of $I_{13}$ through the resistor 37, compensated to take into account the variation of $\Lambda$ with the wavelength, is measured with a standard recorder 17 in order to trace directly $(K_1-K_r$ as a function of the wavelength.

The elements 30 and 31 can be interchanged without incurring disadvantage.

What we claim is:

1. In an apparatus for measuring the circular dichroism of an optionally active specimen comprising a light source, monochromator and polarizer means for forming a monochromatic beam of rectilinearly polarized light flux in a light path, a flux attenuator adapted to vary the intensity of said rectilinearly polarized light flux, a birefringence modulator receiving said intensity varying rectilinearly polarized light flux and imparting a periodic variation of polarization to said light beam from left-hand to right-hand circular polarization conditions and back, means for generating and applying an alternating current of a given frequency to said birefringence modulator, a carrier for said optically active specimen located across said variable polarization light beam, an electro-optical transducer deriving from said variable polarization light beam a signal component at said given frequency and means for controlling by said signal component said flux attenuator and an indicator means for the amount of circular dichroism measure, the improvement consisting of a birefringence modulator comprising a plate of photoelastic material, piezoelectric means coupled to said plate and fed by said alternating current generating means, and an elongated support bar having inserted substantially at the center thereof said photoelastic plate and piezoelectric means.

2. An apparatus for measuring the circular dichroism of an optically active specimen as set forth in claim 1 wherein said plate of photoelastic material has two ends, and said piezoelectric means comprises two piezoelectric plates coupled to said photoelastic plate at the two ends thereof.

3. An apparatus for measuring the circular dichroism of an optically active specimen as set forth in claim 1, wherein said alternating current generating means is concontrolled by said plate of photoelastic material, said plate of photoelastic material having two ends and said piezoelectric means comprises two piezoelectric plates coupled to said photoelastic plate at the two ends thereof, a pressure sensor connected to said elongated bar to sense the pressure thereof, and an amplifier having an input connected to said pressure sensor and an output connected in parallel to said piezoelectric plates.

4. An apparatus for measuring the circular dichroism of an optically active specimen as set forth in claim 1, further comprising a flux attenuator which includes quarter-wave plate, and an analyzer, said quarter-wave plate birefringence modulator and analyzer being serially located along said light path.

5. An apparatus for measuring the circular dichroism of an optically active specimen as set forth in claim 1, wherein a plate of photoelastic material comprises a material selected from the group consisting of glass and fused silica.

References Cited

UNITED STATES PATENTS

| | | | |
|---|---|---|---|
| 2,622,470 | 12/1952 | Rines | 356—114 |
| 2,707,749 | 5/1955 | Mueller | 350—149 X |
| 2,976,764 | 3/1961 | Hyde et al. | 356—116 |
| 3,197,694 | 7/1965 | Cunningham | 356—117 X |
| 3,257,894 | 6/1966 | Grosjean | 356—117 |
| 3,437,399 | 4/1969 | Eden | 350—149 |

FOREIGN PATENTS

| | | |
|---|---|---|
| 1,252,209 | 12/1960 | France. |
| 802,584 | 10/1958 | Great Britain. |

OTHER REFERENCES

ABU-Shumays et al.: "Circular Dichroism Theory and Instrumentation," Analytical Chem., u. 38, No. 7, June 1966, (pp. 29A–58A), 350/154.

RONALD L. WIBERT, Primary Examiner

W. A. SKLAR, Assistant Examiner

U.S. Cl. X.R.

250—225; 350—149, 157; 356—117